US012341913B2

(12) United States Patent
Rapowitz et al.

(10) Patent No.: US 12,341,913 B2
(45) Date of Patent: Jun. 24, 2025

(54) SYSTEMS AND METHODS FOR GENERATING AUTHENTICATION QUIZZES

(71) Applicant: Capital One Services, LLC, McLean, VA (US)

(72) Inventors: Samuel Rapowitz, Roswell, GA (US); Zviad Aznaurashvili, Reston, VA (US); Viraj Chaudhary, Katy, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 338 days.

(21) Appl. No.: 18/165,281

(22) Filed: Feb. 6, 2023

(65) Prior Publication Data

US 2024/0267237 A1 Aug. 8, 2024

(51) Int. Cl.
*H04L 29/06* (2006.01)
*G06N 20/00* (2019.01)
*G06Q 20/38* (2012.01)
*H04L 9/32* (2006.01)

(52) U.S. Cl.
CPC .......... *H04L 9/3271* (2013.01); *G06N 20/00* (2019.01); *G06Q 20/389* (2013.01)

(58) Field of Classification Search
CPC ....... H04L 9/3271; H04L 63/08; G06N 20/00; G06Q 20/389; G06Q 20/4014; G06Q 20/4016
See application file for complete search history.

(56) References Cited

U.S. PATENT DOCUMENTS

| 8,910,274 | B2 | 12/2014 | Sanders |
| 9,262,422 | B1* | 2/2016 | Daniel ................. G06Q 20/347 |
| 9,426,139 | B1 | 8/2016 | McClintock et al. |
| 9,813,411 | B2 | 11/2017 | Thibadeau, Sr. et al. |
| 10,904,234 | B2 | 1/2021 | Ross et al. |
| 2015/0095996 | A1* | 4/2015 | Tang ..................... G06V 40/174 726/6 |
| 2018/0374130 | A1* | 12/2018 | Salem ................ G06Q 30/0609 |
| 2021/0056562 | A1* | 2/2021 | Hart ........................ G06F 16/27 |
| 2021/0081940 | A1 | 3/2021 | Withrow et al. |
| 2021/0279790 | A1* | 9/2021 | Banipal ............. G06Q 30/0185 |
| 2024/0211949 | A1* | 6/2024 | Edwards ............ G06Q 30/0607 |

* cited by examiner

*Primary Examiner* — Shawnchoy Rahman
(74) *Attorney, Agent, or Firm* — TROUTMAN PEPPER LOCKE LLP; Christopher J. Forstner; John A. Morrissett

(57) ABSTRACT

Disclosed embodiments may include a method for generating authentication quizzes. The method can comprise receiving an authentication request associated with a user. The method can further comprise requesting a transaction history associated with the user. The transaction history can comprise a first purchase of a first product and a second purchase of a second product. The method can include selecting the first product and the second product to authenticate the user and determining a third product that the user did not purchase. The method can generate images of the first product, the second product, and the third product based on SKU data and can generate an authentication quiz comprising the images of each product and requests to confirm if the user purchased the products recently or not. Upon receiving correct responses from the user, the method can comprise transmitting instructions to the user device to authenticate the user.

20 Claims, 3 Drawing Sheets

SYSTEMS AND METHODS FOR GENERATING AUTHENTICATION QUIZZES

The disclosed technology relates to systems and methods for generating authentication quizzes. Specifically, this disclosed technology relates to generating authentication quizzes based on images of purchased user products.

BACKGROUND

The development of multi-factor authentication has been a major contribution to bolstering internet security. In typical multi-factor authentication systems, a user will attempt a log-in on a computing device. The user will then receive a code, prompt, or other token on a user device separate from the computing device. Once the user confirms receipt of the code, prompt, or other token, the user will be authenticated and logged in on the computing device. Such systems are known as two-factor authentication systems. Two-factor authentication systems arose out of a desire to improve client security and prevent fraudulent log-in attempts. As a result, there is a desire to produce more effective tests for multi-factor authentication.

Traditional systems and methods for generating authentication quizzes typically generate a simple puzzle, such as reCAPTCHA (including optical character recognition, word interpretation/deciphering, and/or image solving/selection), or a simple code that should be input before logging in. While such traditional systems and methods may protect against computer hackers or brute-force methods, a fraudster wishing to access an account protected by such methods simply needs to either guess the reCAPTCHA or obtain access to the additional device receiving the multi-factor authentication code. Adding a level of unique personalization to the authentication quiz could increase security for a user, but methods such as security questions are too well known. In such a situation, a fraudster could infer or socially engineer answers to security questions to gain access to a user's account. Therefore, it is desirable to include a level of unique personalization that can evolve and change while remaining familiar to the original user.

Accordingly, there is a need for improved systems and methods for generating authentication quizzes. Embodiments of the present disclosure are directed to this and other considerations.

SUMMARY

Disclosed embodiments may include a system for generating authentication quizzes. The system may include one or more processors, and memory in communication with the one or more processors and storing instructions that, when executed by the one or more processors, are configured to cause the system to provide a method for generating authentication quizzes. The method can comprise receiving an authentication request associated with a user. The user can be in possession of a user device that can be in communication with an authentication server, and the request can be received from the user device. The method can further comprise requesting a transaction history associated with the user from a transaction history database. The transaction history can comprise a first purchase of a first product and a second purchase of a second product. The method can further comprise selecting the first product and the second product to authenticate the user. The first product and the second product can be selected by a machine learning model. The machine learning model can further determine a third product that the user did not purchase based on the transaction history. The method can then include generating images of the first product, the second product, and the third product based on stock keeping unit (SKU) data. This can further include generating an authentication quiz comprising the images of each product and requests to the user to confirm if the user purchased the products recently or not. Upon receiving responses from the user confirming that the user responded correctly, the method can comprise transmitting instructions to the user device to authenticate the user.

Disclosed embodiments may include a system for generating authentication quizzes. The system may include one or more processors, and memory in communication with the one or more processors and storing instructions that, when executed by the one or more processors, are configured to cause the system to provide a method for generating authentication quizzes. The method can comprise receiving an authentication request associated with a user. The user can be in possession of a user device that can be in communication with an authentication server, and the request can be received from the user device. The method can further comprise requesting a transaction history associated with the user from a transaction history database. The transaction history can comprise a first purchase of a first product and a second purchase of a second product. The machine learning model can then select the first product to authenticate the user and subsequently generate an image of the first product and a request to the user to confirm that the user purchased the first product. The image can be obtained based on SKU data. Subsequent to receiving a first response from the user confirming that the user purchased the first product, the machine learning model can select the second product to authenticate the user. This can include updating the authentication quiz to include an image of the second product and a request to the user to confirm that the user purchased the second product. This image can also be obtained based on SKU data. Subsequent to receiving a second response from the user confirming that the user purchased the second product, the method can comprise transmitting instructions to the user device to authenticate the user.

Disclosed embodiments may include a system for generating authentication quizzes. The system may include one or more processors, and memory in communication with the one or more processors and storing instructions that, when executed by the one or more processors, are configured to cause the system to provide a method for generating authentication quizzes. The method can comprise receiving an authentication request associated with a user. The user can be in possession of a user device that can be in communication with an authentication server, and the request can be received from the user device. The method can further comprise requesting a transaction history associated with the user from a transaction history database. The transaction history can comprise a first purchase of a first product and a second purchase of a second product. The method can further comprise selecting the first product and the second product to authenticate the user. The first product and the second product can be selected by a machine learning model. The method can further include determining a first merchant associated with the first purchase and a second merchant associated with the second purchase. The method can then include generating images of the first product and the second product based on stock keeping unit (SKU) data. This can further include generating an authentication quiz comprising the images of each product, an indication of each merchant, and a request to the user to match each product to the corresponding merchant where each product was purchased. Subsequent to receiving response from the user matching the first product to the first merchant and the second product to the second merchant, the method can comprise transmitting instructions to the user device to authenticate the user.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1:
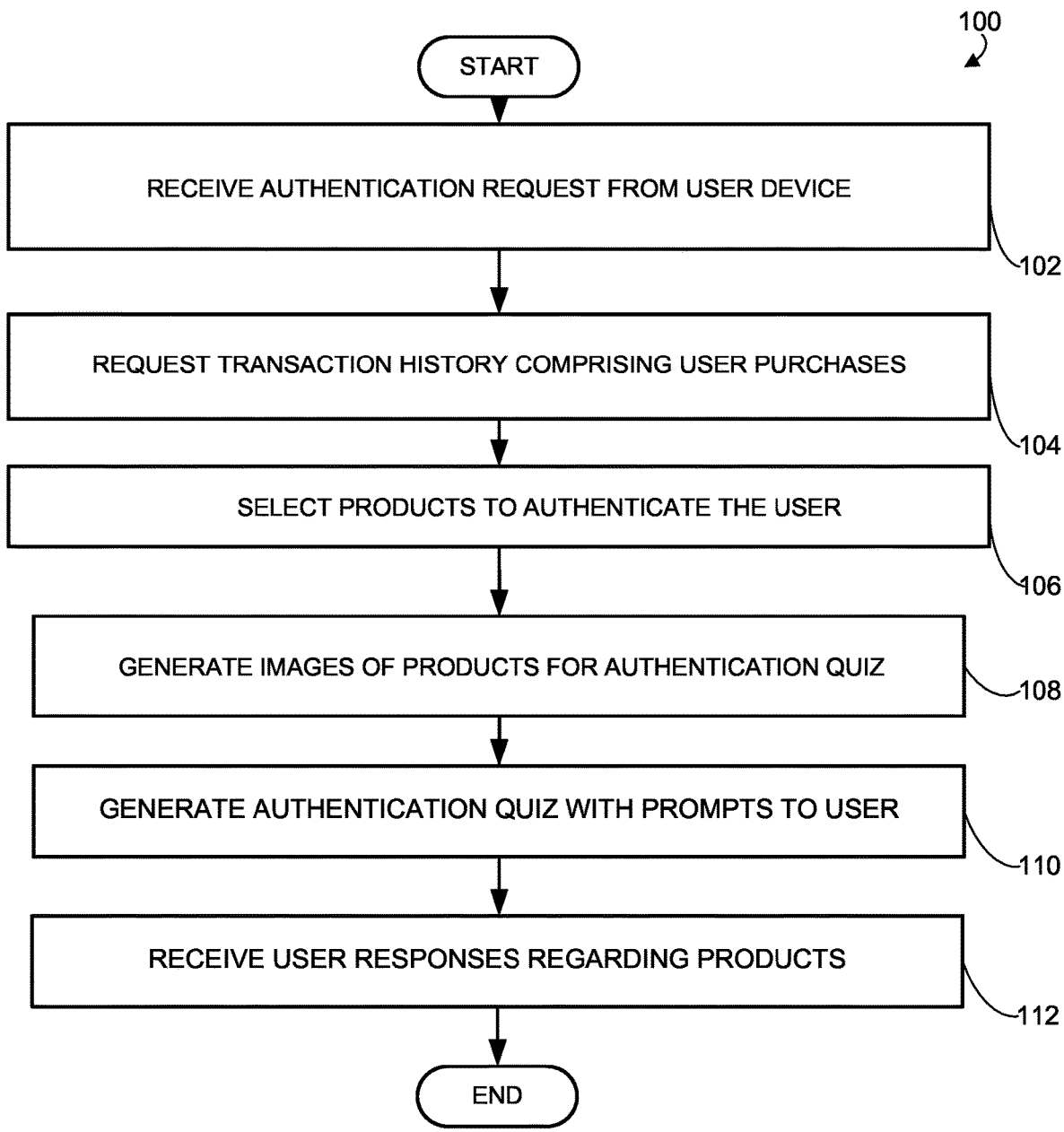
FIG. 1 is a flow diagram illustrating an exemplary method for generating authentication quizzes in accordance with certain embodiments of the disclosed technology.

Examples of the present disclosure related to systems and methods for generating authentication quizzes. More particularly, the disclosed technology relates to generating authentication quizzes based on a user's purchase history. The systems and methods described herein utilize, in some instances, machine learning models, which are necessarily rooted in computers and technology. Machine learning models are a unique computer technology that involves training models to complete tasks and make decisions. The present disclosure details using machine learning models to select a variety of products purchased by a user to be used in an authentication quiz. This, in some examples, may involve using purchase history from a variety of users as input data and machine learning model, such as a convolutional neural network, applied to predict products that will be memorable to a user while being difficult for a fraudster to guess, and outputs a result of predictable products for an authentication quiz along with SKU data. Using a machine learning model in this way may allow the system to improve the accessibility of authentication quizzes for users while making authentication quizzes more difficult for fraudsters. This is a clear advantage and improvement over prior technologies that simply send a multi-factor authentication code or prompt a user for an optical character recognition puzzle because such traditional authentication puzzles can be spoofed or defrauded. Such authentication puzzles may also mistakenly restrict an authentic user in cases where the puzzle is too difficult. The present disclosure solves this problem by analyzing user purchase history to select memorable purchased products. The machine learning models can further dynamically tune the authentication quizzes using a variety of factors, such as a predetermined tolerance for error, a temporal length from which to retrieve historical transactions, a difficulty based on number of questions or prompts, memorability of purchased products, guessability of purchased products, the performance of similar customers, and the like. Overall, the systems and methods disclosed have significant practical applications in the authentication and cryptography field because of the noteworthy improvements of improving accessibility and selectivity of dynamic authentication quizzes, which are important to solving present problems with this technology.

Furthermore, the systems and methods described herein improve, in some instances, the operation of computers and technology. The present disclosure details fraud prevention and identification tools. This, in some examples, may involve using an authentication server to dynamically generate authentication quizzes based on user purchase history, which improves the function of authentication systems. Using a computer system configured in this way may allow the system to more quickly allow users access to protected systems while preventing fraudulent access. This is a clear advantage and improvement over prior technologies that merely prevent access from robots because fraudulent access can still occur. The present disclosure solves this problem by generating images based on SKU data found in user purchase history to provide dynamic authentication quizzes. Furthermore, examples of the present disclosure may also improve the speed with which computers can identify fraud by using transaction data to authenticate users instead of codes. Overall, the systems and methods disclosed have significant practical applications in the cryptography and security fields because of the noteworthy improvements of fraud detection and reduced friction for an authentic user, which are important to solving present problems with this technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a flow diagram illustrating an exemplary method 100 for generating authentication quizzes, in accordance with certain embodiments of the disclosed technology. The steps of method 100 may be performed by one or more components of the system 300 (e.g., authentication server 220 or web server 310 of authentication system 308 or user device 302), as described in more detail with respect to FIGS. 2 and 3.

In block 102, the authentication server 220 may receive an authentication request from a user device 302. The authentication request can be associated with a user in possession of the user device 302. The authentication request can include a log-in request for a user to log into an account on the user device 302. The authentication request can be received from an application programming interface (API) of an application on the user device 302. The method 100 can then proceed on to block 104.

In block 104, the authentication server 220 may request or retrieve transaction history data from the transaction history database 316. The transaction history data can comprise a first purchase of a first product and a second purchase of a second product. The transaction history data can include several transactions and/or purchases in addition to the first purchase and the second purchase. The transaction history can be obtained based on a desired recency of the first purchase and the second purchase. The desired recency can be tuned based on a difficulty of authentication. For example, a more difficult authentication can obtain transaction history from a larger temporal timeframe, and an easier authentication can obtain more recent transaction history. The transaction history can be contained in a variety of data structures within the transaction history database 316. The method 100 can then proceed on to block 160.

In block 106, the authentication server 220 may select the first product and the second product to authenticate the user. The authentication server 220 can use a machine learning model to select the products. The machine learning model can comprise a fraud prediction model. The first product and the second product can be selected based on a desired or predetermined difficulty associated with the authentication request. For example, a more difficult authentication can obtain products that were purchased further in the past, and an easier authentication can obtain products that were purchased recently. The predetermined difficulty can include a variety of different factors, such as recency (as described above), a likelihood that the user would repeat the purchase, and/or a confidence threshold that a fraudster could not guess the purchase.

The authentication server 220 can also select a third product that the user did not purchase to further test the user. The authentication server 220 can use the machine learning model to select the third product based on a variety of factors, such as a desired or predetermined difficulty associated with the authentication request. For example, a more difficult authentication can obtain products that are commonly purchased by customers similar to the user, and an easier authentication can obtain products that are exotic and/or uncommonly purchased. The predetermined difficulty can include a variety of different factors, such as a likelihood that the user would repeat the purchase and/or a confidence threshold that a fraudster could not guess the purchase.

The authentication server 220 can select the first product initially and then may select the second product after receiving a response from the user to further test the user. If the authentication server 220 and/or the machine learning model remain unsatisfied with the user's answers, the machine learning model can then select the third product after the second product response is received. The method 100 can then proceed on to block 108.

In block 108, the authentication server 220 may generate images of any of the selected products using SKU data from the transaction history data. The purchases may be associated with respective merchants in the transaction history. As such, the authentication server 220 can send requests to the merchants using the SKU data to obtain images of the respective products. Alternatively, or in addition, the machine learning model can utilize the SKU data and transaction history from customers who purchased related products to generate the product images itself, based on electronically available data. The method 100. can then proceed on to block 110.

In block 110, the authentication server 220 may generate an authentication quiz comprising the images of the products and requests to the user to confirm whether or not they purchased the products. The requests can be issued to the user in the form of prompts on a graphical user interface (GUI) on the user device 302. For example, the authentication quiz can display an image of a product along with a prompt asking the user if they purchased the product, and the user can respond using a drop-down menu that has the options "yes" and "no."

The authentication server 220 can generate the authentication quiz all at once, or it may generate individual questions as responses are received from the user. In other words, the product images and prompts can be issued to the user either in batches or piecewise. As would be appreciated, piecewise questions can allow the authentication server 220 to more finely tune the authentication quiz based on user response as they are received. Further, questions in batches can reduce the burden on the user device 302 and may reduce the number of redundant questions or nuisance to the user attempting to log in.

The authentication server 220 can, alternatively or in addition, generate an authentication quiz comprising images of the products and merchant information with requests to the user to match the products to the merchant at which they purchased the products. On the GUI of the user device 302, this can include a variety of matching methods. For example, the user device 302 can prompt the user to drag and drop the images of the purchased products over the images of the corresponding merchants. The method 100 can then proceed on to block 112.

In block 112, the authentication server 220 may receive responses from the user (e.g., from the user device 302). The responses can be compared directly to the transaction history for accuracy. Alternatively, or in addition, the machine learning model can analyze the response and behavior (e.g., time to respond) to determine if the user is authentic or a fraudster.

In response, the authentication server 220 can instruct the user device 302 to authenticate the user. The authentication server 220 could also repeat any of the aforementioned steps to generate further quizzes or tests for the user. For example, if the authentication server 220 is using piecewise questions, the authentication server 220 can revert back to selecting additional products from the user's transaction history. The method 100 can terminate after block 112. In some examples, however, the method 100 can proceed on to other method steps not shown but described herein.

Figure 2:
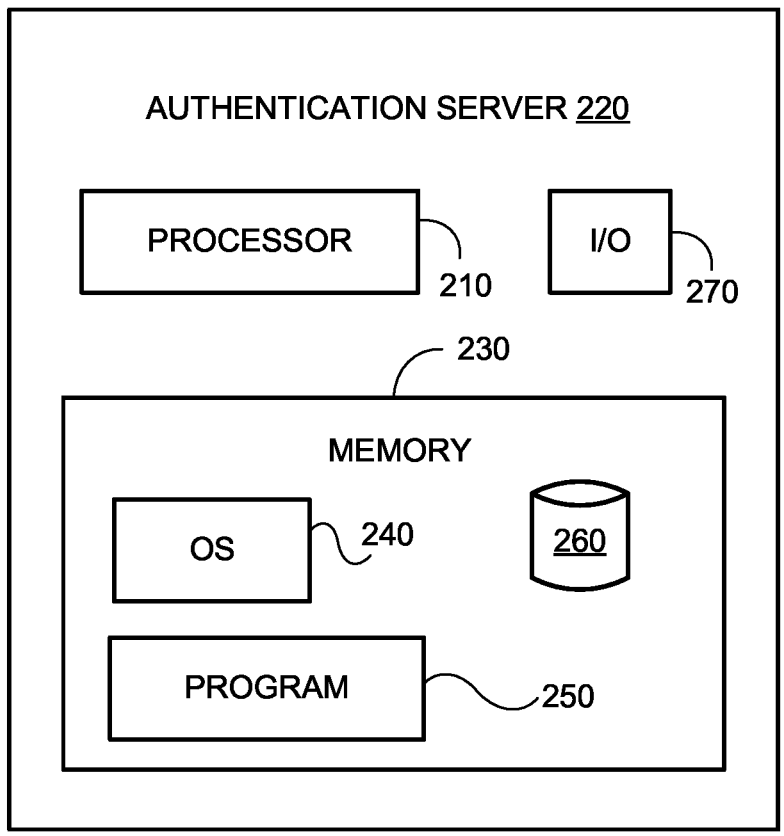
FIG. 2 is a block diagram of an exemplary authentication server used to provide authentication quizzes, according to an example implementation of the disclosed technology.
Figure 3:
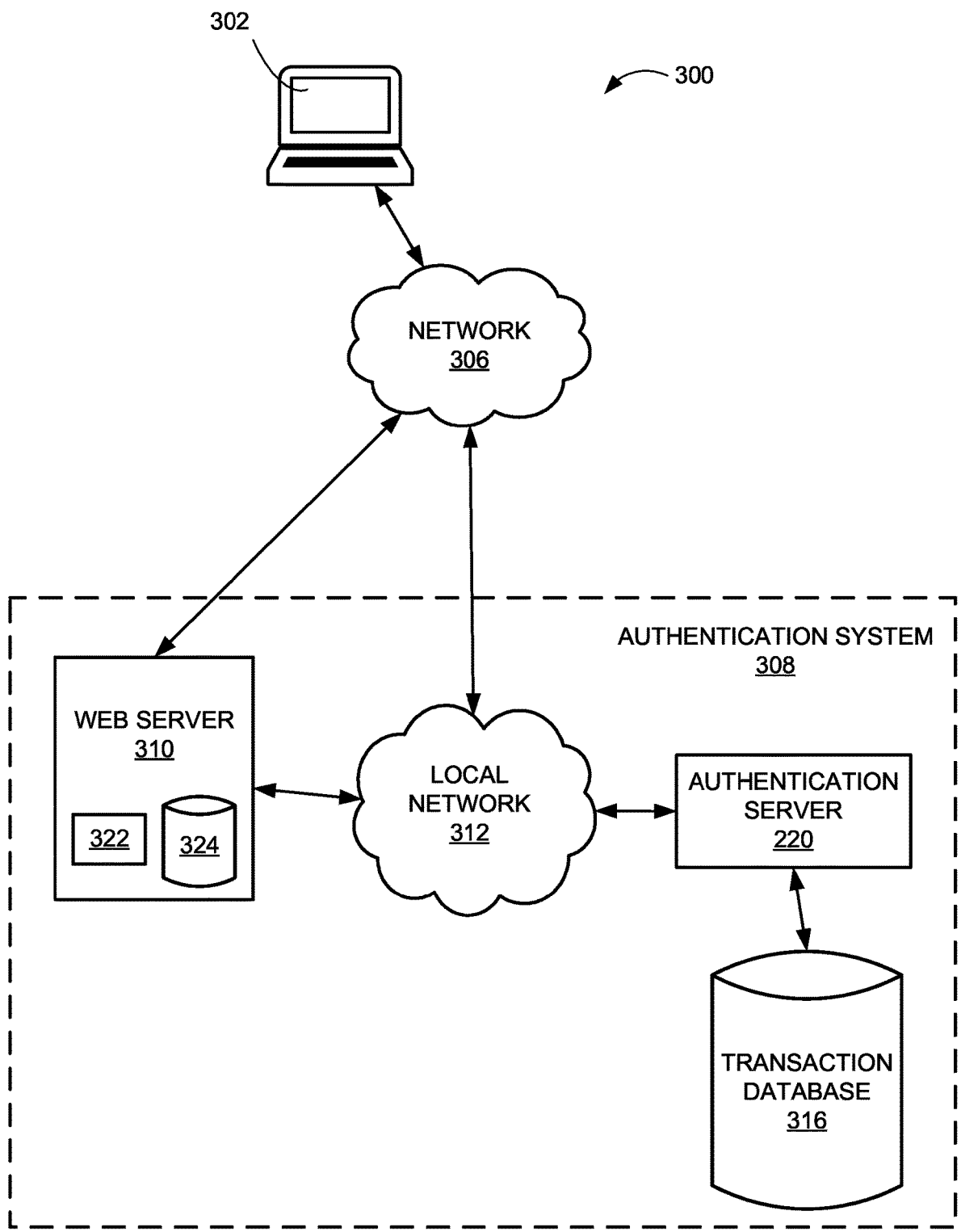
FIG. 3 is a block diagram of an exemplary system that may be used to provide generating authentication quizzes, according to an example implementation of the disclosed technology.

FIG. 2 is a block diagram of an example authentication server 220 used to implement various authentication methods and/or generate authentication quizzes according to an example implementation of the disclosed technology. According to some embodiments, the user device 302 and web server 310, as depicted in FIG. 3 and described below, may have a similar structure and components that are similar to those described with respect to authentication server 220 shown in FIG. 2. As shown, the authentication server 220 may include a processor 210, an input/output (I/O) device 270, a memory 230 containing an operating system (OS) 240 and a program 250. In certain example implementations, the authentication server 220 may be a single server or may be configured as a distributed computer system including multiple servers or computers that interoperate to perform one or more of the processes and functionalities associated with the disclosed embodiments. In some embodiments authentication server 220 may be one or more servers from a serverless or scaling server system. In some embodiments, the authentication server 220 may further include a peripheral interface, a transceiver, a mobile network interface in communication with the processor 210, a bus configured to facilitate communication between the various components of the authentication server 220, and a power source configured to power one or more components of the authentication server 220.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 230.

The processor 210 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 210 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 210 may be a single core processor that is configured with virtual processing technologies. In certain embodiments, the processor 210 may use logical processors to simultaneously execute and control multiple processes. The processor 210 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the authentication server 220 may include one or more storage devices configured to store information used by the processor 210 (or other components) to perform certain functions related to the disclosed embodiments. In one example, the authentication server 220 may include the memory 230 that includes instructions to enable the processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The authentication server 220 may include a memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the authentication server 220 may include the memory 230 that may include one or more programs 250 to perform one or more functions of the disclosed embodiments. For example, in some embodiments, the authentication server 220 may additionally manage dialogue and/or other interactions with the customer via a program 250.

The processor 210 may execute one or more programs 250 located remotely from the authentication server 220. For example, the authentication server 220 may access one or more remote programs that, when executed, perform functions related to disclosed embodiments.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 230 may include software components that, when executed by the processor 210, perform one or more processes consistent with the disclosed embodiments. In some embodiments, the memory 230 may include an authentication server database 260 for storing related data to enable the authentication server 220 to perform one or more of the processes and functionalities associated with the disclosed embodiments.

The authentication server database 260 may include stored data relating to status data (e.g., average session duration data, location data, idle time between sessions, and/or average idle time between sessions) and historical status data. According to some embodiments, the functions provided by the authentication server database 260 may also be provided by a database that is external to the authentication server 220, such as the transaction history database 316 as shown in FIG. 3.

The authentication server 220 may also be communicatively connected to one or more memory devices (e.g., databases) locally or through a network. The remote memory devices may be configured to store information and may be accessed and/or managed by the authentication server 220. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The authentication server 220 may also include one or more I/O devices 270 that may comprise one or more interfaces for receiving signals or input from devices and providing signals or output to one or more devices that allow data to be received and/or transmitted by the authentication server 220. For example, the authentication server 220 may include interface components, which may provide interfaces to one or more input devices, such as one or more keyboards, mouse devices, touch screens, track pads, trackballs, scroll wheels, digital cameras, microphones, sensors, and the like, that enable the authentication server 220 to receive data from a user (such as, for example, via the user device 302).

In examples of the disclosed technology, the authentication server 220 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The authentication server 220 may contain programs that train, implement, store, receive, retrieve, and/or transmit one or more machine learning models. Machine learning models may include a neural network model, a generative adversarial model (GAN), a recurrent neural network (RNN) model, a deep learning model (e.g., a long short-term memory (LSTM) model), a random forest model, a convolutional neural network (CNN) model, a support vector machine (SVM) model, logistic regression, XGBoost, and/or another machine learning model. Models may include an ensemble model (e.g., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. The authentication server 220 may be configured to adjust model parameters during training. Model parameters may include weights, coefficients, offsets, or the like. Training may be supervised or unsupervised.

The authentication server 220 may be configured to train machine learning models by optimizing model parameters and/or hyperparameters (hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. The authentication server 220 may be configured to optimize statistical models using known optimization techniques.

Furthermore, the authentication server 220 may include programs configured to retrieve, store, and/or analyze properties of data models and datasets. For example, authentication server 220 may include or be configured to implement one or more data-profiling models. A data-profiling model may include machine learning models and statistical models to determine the data schema and/or a statistical profile of a dataset (e.g., to profile a dataset), consistent with disclosed embodiments. A data-profiling model may include an RNN model, a CNN model, or other machine-learning model.

The authentication server 220 may include algorithms to determine a data type, key-value pairs, row-column data structure, statistical distributions of information such as keys or values, or other property of a data schema may be configured to return a statistical profile of a dataset (e.g., using a data-profiling model). The authentication server 220 may be configured to implement univariate and multivariate statistical methods. The authentication server 220 may include a regression model, a Bayesian model, a statistical model, a linear discriminant analysis model, or other classification model configured to determine one or more descriptive metrics of a dataset. For example, authentication server 220 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

The authentication server 220 may be configured to return a statistical profile of a dataset (e.g., using a data-profiling model or other model). A statistical profile may include a plurality of descriptive metrics. For example, the statistical profile may include an average, a mean, a standard deviation, a range, a moment, a variance, a covariance, a covariance matrix, a similarity metric, or any other statistical metric of the selected dataset. In some embodiments, authentication server 220 may be configured to generate a similarity metric representing a measure of similarity between data in a dataset. A similarity metric may be based on a correlation, covariance matrix, a variance, a frequency of overlapping values, or other measure of statistical similarity.

The authentication server 220 may be configured to generate a similarity metric based on data model output, including data model output representing a property of the data model. For example, authentication server 220 may be configured to generate a similarity metric based on activation function values, embedding layer structure and/or outputs, convolution results, entropy, loss functions, model training data, or other data model output). For example, a synthetic data model may produce first data model output based on a first dataset and a produce data model output based on a second dataset, and a similarity metric may be based on a measure of similarity between the first data model output and the second-data model output. In some embodiments, the similarity metric may be based on a correlation, a covariance, a mean, a regression result, or other similarity between a first data model output and a second data model output. Data model output may include any data model output as described herein or any other data model output (e.g., activation function values, entropy, loss functions, model training data, or other data model output). In some embodiments, the similarity metric may be based on data model output from a subset of model layers. For example, the similarity metric may be based on data model output from a model layer after model input layers or after model embedding layers. As another example, the similarity metric may be based on data model output from the last layer or layers of a model.

The authentication server 220 may be configured to classify a dataset. Classifying a dataset may include determining whether a dataset is related to another datasets. Classifying a dataset may include clustering datasets and generating information indicating whether a dataset belongs to a cluster of datasets. In some embodiments, classifying a dataset may include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may and indicate a similarity between datasets and/or a hierarchical relationship (e.g., a data lineage, a parent-child relationship). In some embodiments, classifying a dataset may include generating graphical data, such as anode diagram, a tree diagram, or a vector diagram of datasets. Classifying a dataset may include estimating a likelihood that a dataset relates to another dataset, the likelihood being based on the similarity metric.

The authentication server 220 may include one or more data classification models to classify datasets based on the data schema, statistical profile, and/or edges. A data classification model may include a convolutional neural network, a random forest model, a recurrent neural network model, a support vector machine model, or another machine learning model. A data classification model may be configured to classify data elements as actual data, synthetic data, related data, or any other data category. In some embodiments, authentication server 220 is configured to generate and/or train a classification model to classify a dataset, consistent with disclosed embodiments.

The authentication server 220 may also contain one or more prediction models. Prediction models may include statistical algorithms that are used to determine the probability of an outcome, given a set amount of input data. For example, prediction models may include regression models that estimate the relationships among input and output variables. Prediction models may also sort elements of a dataset using one or more classifiers to determine the probability of a specific outcome. Prediction models may be parametric, non-parametric, and/or semi-parametric models.

In some examples, prediction models may cluster points of data in functional groups such as "random forests." Random Forests may comprise combinations of decision tree predictors. (Decision trees may comprise a data structure mapping observations about something, in the "branch" of the tree, to conclusions about that thing's target value, in the "leaves" of the tree.) Each tree may depend on the values of a random vector sampled independently and with the same distribution for all trees in the forest. Prediction models may also include artificial neural networks. Artificial neural networks may model input/output relationships of variables and parameters by generating a number of interconnected nodes which contain an activation function. The activation function of a node may define a resulting output of that node given an argument or a set of arguments. Artificial neural networks may generate patterns to the network via an 'input layer', which communicates to one or more "hidden layers" where the system determines regressions via one or more weighted connections. Prediction models may additionally or alternatively include classification and regression trees, or other types of models known to those skilled in the art. To generate prediction models, the authentication server may analyze information applying machine-learning methods.

While the authentication server 220 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the authentication server 220 may include a greater or lesser number of components than those illustrated.

FIG. 3 is a block diagram of an example system that may be used to interact with authentication system 308, according to an example implementation of the disclosed technology. The components and arrangements shown in FIG. 3 are not intended to limit the disclosed embodiments as the components used to implement the disclosed processes and features may vary. As shown, authentication system 308 may interact with a user device 302 via a network 306. In certain example implementations, the authentication system 308 may include a local network 312, an authentication server 220, a web server 310, and a transaction history database 316.

In some embodiments, a user may operate the user device 302. The user device 302 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 306 and ultimately communicating with one or more components of the authentication system 308. In some embodiments, the user device 302 may include or incorporate electronic communication devices for hearing or vision impaired users.

According to some embodiments, the user device 302 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The network 306 may be of any suitable type, including individual connections via the internet such as cellular or WiFi networks. In some embodiments, the network 306 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 306 may include any type of computer networking arrangement used to exchange data. For example, the network 306 may be the Internet, a private data network, virtual private network (VPN) using a public network, and/or other suitable connection(s) that enable(s) components in the system 300 environment to send and receive information between the components of the system 300. The network 306 may also include a PSTN and/or a wireless network.

The authentication system 308 may be associated with and optionally controlled by one or more entities such as a business, corporation, individual, partnership, or any other entity that provides one or more of goods, services, and consultations to individuals such as customers. In some embodiments, the authentication system 308 may be controlled by a third party on behalf of another business, corporation, individual, partnership. The authentication system 308 may include one or more servers and computer systems for performing one or more functions associated with products and/or services that the organization provides.

Web server 310 may include a computer system configured to generate and provide one or more websites accessible to customers, as well as any other individuals involved in access system 308's normal operations. Web server 310 may include a computer system configured to receive communications from user device 302 via for example, a mobile application, a chat program, an instant messaging program, a voice-to-text program, an SMS message, email, or any other type or format of written or electronic communication. Web server 310 may have one or more processors 322 and one or more web server databases 324, which may be any suitable repository of website data. Information stored in web server 310 may be accessed (e.g., retrieved, updated, and added to) via local network 312 and/or network 306 by one or more devices or systems of system 300. In some embodiments, web server 310 may host websites or applications that may be accessed by the user device 302. For example, web server 310 may host a financial service provider website that a user device may access by providing an attempted login that are authenticated by the authentication server 220. According to some embodiments, web server 310 may include software tools, similar to those described with respect to user device 302 above, that may allow web server 310 to obtain network identification data from user device 302. The web server may also be hosted by an online provider of website hosting, networking, cloud, or backup services, such as Microsoft Azure™ or Amazon Web Services™.

The local network 312 may include any type of computer networking arrangement used to exchange data in a localized area, such as WiFi, Bluetooth™, Ethernet, and other suitable network connections that enable components of the authentication system 308 to interact with one another and to connect to the network 306 for interacting with components in the system 300 environment. In some embodiments, the local network 312 may include an interface for communicating with or linking to the network 306. In other embodiments, certain components of the authentication system 308 may communicate via the network 306, without a separate local network 306.

The authentication system 308 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 302 may be able to access authentication system 308 using the cloud computing environment. User device 302 may be able to access authentication system 308 using specialized software. The cloud computing environment may eliminate the need to install specialized software on user device 302.

In accordance with certain example implementations of the disclosed technology, the authentication system 308 may include one or more computer systems configured to compile data from a plurality of sources the authentication server 220, web server 310, and/or the transaction history database 316. The authentication server 220 may correlate compiled data, analyze the compiled data, arrange the compiled data, generate derived data based on the compiled data, and store the compiled and derived data in a database such as the transaction history database 316. According to some embodiments, the transaction history database 316 may be a database associated with an organization and/or a related entity that stores a variety of information relating to customers, transactions, ATM, and business operations. The transaction history database 316 may also serve as a back-up storage device and may contain data and information that is also stored on, for example, server database 260, as discussed with reference to FIG. 2.

Embodiments consistent with the present disclosure may include datasets. Datasets may comprise actual data reflecting real-world conditions, events, and/or measurements. However, in some embodiments, disclosed systems and methods may fully or partially involve synthetic data (e.g., anonymized actual data or fake data). Datasets may involve numeric data, text data, and/or image data. For example, datasets may include transaction data, financial data, demographic data, public data, government data, environmental data, traffic data, network data, transcripts of video data, genomic data, proteomic data, and/or other data. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Datasets of disclosed embodiments may have a respective data schema (e.g., structure), including a data type, key-value pair, label, metadata, field, relationship, view, index, package, procedure, function, trigger, sequence, synonym, link, directory, queue, or the like. Datasets of the embodiments may contain foreign keys, for example, data elements that appear in multiple datasets and may be used to cross-reference data and determine relationships between datasets. Foreign keys may be unique (e.g., a personal identifier) or shared (e.g., a postal code). Datasets of the embodiments may be "clustered," for example, a group of datasets may share common features, such as overlapping data, shared statistical properties, or the like. Clustered datasets may share hierarchical relationships (e.g., data lineage).

Example Use Case

The following example use case describes an example of a typical user flow pattern. This section is intended solely for explanatory purposes and not in limitation.

A user can attempt to log into their bank account on their cell phone. The bank API on the cell phone can send the log-in request to the bank's authentication server. The authentication server can retrieve the user's purchase history to determine that they purchased a box of chocolate from Target approximately a month ago and a set of ear buds from Walmart approximately four months ago.

In one example, the system can select the box of chocolate and the car buds along with a fake purchase, such as a thermos from the same Target. Using the SKU data from the purchase history, the authentication server can generate images of the box of chocolate, the car buds, and the thermos along with prompts asking the user if they indeed purchased the products. The user can then confirm that they purchased the box of chocolate and the ear buds but did not purchase the thermos. In response, the authentication server can instruct the API on the user device to log-in the user to the bank account.

In another example, the system can utilize a machine learning algorithm to first select the box of chocolate because the box of chocolate is determined to be memorable to a user while being difficult for a fraudster to guess. Using the SKU data from the purchase history, the authentication server can generate an image of the box of chocolate along with a prompt asking the user if they purchased it. The user can then confirm that they purchased the box of chocolate. In response, the system can utilize the machine learning algorithm to secondly select a fake purchase, such as a thermos from the same Target. Using SKU data, the authentication server can generate an image of the thermos along with a prompt asking the user if they purchased it. The user might then mistakenly confirm that they purchased the box of chocolate. Because mistakes happen, the system may give the user a chance for redemption. The machine learning algorithm can thirdly select the ear buds because the ear buds are determined to be very memorable to a user. Using the SKU data from the purchase history, the authentication server can generate an image of the ear buds along with a prompt asking the user if they purchased it. The user can then confirm that they purchased the ear buds. In response, the authentication server can instruct the API on the user device to log-in the user to the bank account.

In another example, the system can select the box of chocolate and the car buds. Using the SKU data from the purchase history, the authentication server can generate images of the box of chocolate and the ear buds. The authentication server can also obtain merchant information from the purchase history to generate indications of the particular Target where the box of chocolate was purchase and the particular Walmart where the ear buds were purchased. The authentication server can then generate prompts instructing the user to match the purchased products with the merchant at which they were purchased. The user can then match the box of chocolate to the Target and the ear buds to the Walmart. In response, the authentication server can instruct the API on the user device to log-in the user to the bank account.

In some examples, disclosed systems or methods may involve one or more of the following clauses:

Clause 1: An authentication method comprising: receiving, from a user device in communication with an authentication server, an authentication request associated with a user in possession of the user device; requesting, from a transaction history database, a transaction history associated with the user, the transaction history comprising a first purchase of a first product and a second purchase of a second product; selecting, using a machine learning model, the first product and the second product to authenticate the user; determining, based on the transaction history associated with the user, a third product that the user did not purchase; generating, based on stock keeping unit (SKU) data, images of the first product, the second product, and the third product; generating, by the machine learning model, an authentication quiz comprising: the images of the first product, the second product, and the third product; and requests to the user to confirm that the user purchased the first product, the second product, and the third product; receiving, from the user device, responses from the user confirming that the user purchased the first product and the second product and denying that the user purchased the third product; and transmitting instructions to the user device to authenticate the user.

Clause 2: The method of Clause 1, wherein the machine learning model comprises a machine learning fraud prediction model.

Clause 3: The method of Clause 1, wherein the first product and the second product are selected based on a predetermined difficulty associated with the authentication request.

Clause 4: The method of Clause 3, wherein the predetermined difficulty is calculated based on a recency of the first purchase and the second purchase.

Clause 5: The method of Clause 3, wherein the predetermined difficulty is calculated based on a likelihood of the user repeating the first purchase and the second purchase.

Clause 6: The method of Clause 3, wherein the predetermined difficulty is calculated based on a confidence threshold set by the authentication server.

Clause 7: An authentication method comprising: receiving, from a user device in communication with an authentication server, an authentication request associated with a user in possession of the user device; requesting, from a transaction history database, a transaction history associated with the user, the transaction history comprising a first purchase of a first product and a second purchase of a second product; selecting, using a machine learning model, the first product to authenticate the user; generating, by the machine learning model, an authentication quiz comprising: an image of the first product, the image being obtained based on stock keeping unit (SKU) data of the first product; and a request to the user to confirm that the user purchased the first product; receiving, from the user device, a first response from the user confirming that the user purchased the first product; selecting, by the machine learning model, the second product to authenticate the user; updating, by the machine learning model, the authentication quiz to include: an image of the second product, the image being obtained based on SKU data of the second product; and a request to the user to confirm that the user purchased the second product; receiving, from the user device, a second response from the user confirming that the user purchased the second product; and transmitting instructions to the user device to authenticate the user.

Clause 8: The method of Clause 7, further comprising: responsive to receiving the second response, selecting, by the machine learning model, a third product to authenticate the user, the third product being not purchased by the user; updating, by the machine learning model, the authentication quiz to include: an image of the third product, the image being obtained based on SKU data of the third product; and a request to the user to confirm that the user purchased the third product; and receiving, from the user device, a third response from the user denying that the user purchased the third product.

Clause 9: The method of Clause 7, wherein the first purchase is associated with a first merchant and the second purchase is associated with a second merchant, and the images of the first product and the second product are obtained by requesting the first merchant and the second merchant, respectively, with the SKU data of the first product and the second product.

Clause 10: The method of Clause 7, wherein the machine learning model comprises a machine learning fraud prediction model.

Clause 11: The method of Clause 7, wherein the first product and the second product are selected based on a predetermined difficulty associated with the authentication request.

Clause 12: The method of Clause 11, wherein the predetermined difficulty is calculated based on a likelihood of the user repeating the first purchase and the second purchase.

Clause 13: The method of Clause 11, wherein the predetermined difficulty is calculated based on a confidence threshold set by the authentication server.

Clause 14: The method of Clause 11, wherein the predetermined difficulty is calculated based on a recency of the first purchase and the second purchase.

Clause 15: The method of Clause 14, wherein the transaction history associated with the user is requested based to include a number of purchases based on the recency and the predetermined difficulty.

Clause 16: An authentication method comprising: receiving, from a user device in communication with an authentication server, an authentication request associated with a user in possession of the user device; requesting, from a transaction history database, a transaction history associated with the user, the transaction history comprising a first purchase of a first product and a second purchase of a second product; selecting, using a machine learning model, the first product and the second product to authenticate the user; determining a first merchant associated with the first purchase and a second merchant associated with the second purchase; generating, based on stock keeping unit (SKU) data, images of the first product and the second product; generating, by the machine learning model, an authentication quiz comprising: the images of the first product and the second product; an indication of the first merchant and the second merchant; and a request to the user to match the first product and the second product to the corresponding merchant of the first merchant and the second merchant where the first purchase and the second purchase occurred; receiving, from the user device, responses from the user matching the first product to the first merchant and the second product to the second merchant; and transmitting instructions to the user device to authenticate the user.

Clause 17: The method of Clause 16, wherein the first purchase is associated with a first merchant and the second purchase is associated with a second merchant, and the images of the first product and the second product are obtained by requesting the first merchant and the second merchant, respectively, with the SKU data of the first product and the second product.

Clause 18: The method of Clause 16, wherein the machine learning model comprises a machine learning fraud prediction model.

Clause 19: The method of Clause 16, wherein the first product and the second product are selected based on a predetermined difficulty associated with the authentication request.

Clause 20: The method of Clause 19, wherein the predetermined difficulty is calculated based on a confidence threshold set by the authentication server.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An authentication method comprising:
receiving, from a user device in communication with an authentication server, an authentication request associated with a user in possession of the user device;
requesting, from a transaction history database, a transaction history associated with the user, the transaction history comprising a first purchase of a first product and a second purchase of a second product;
selecting, using a machine learning model, the first product and the second product to authenticate the user;
identifying, based on the transaction history associated with the user, a third product that the user did not purchase;
generating, based on stock keeping unit (SKU) data, images of the first product, the second product, and the third product;
generating, by the machine learning model, an authentication quiz comprising:
the images of the first product, the second product, and the third product; and
requests to the user to confirm that the user purchased one or more of the first product, the second product, and the third product;
receiving, from the user device, responses from the user confirming that the user purchased the first product and the second product and denying that the user purchased the third product; and
transmitting instructions to the user device to authenticate the user.

2. The method of claim 1, wherein the machine learning model comprises a machine learning fraud prediction model.

3. The method of claim 1, wherein the first product and the second product are selected based on a predetermined difficulty associated with the authentication request.

4. The method of claim 3, wherein the predetermined difficulty is calculated based on a recency of the first purchase and the second purchase.

5. The method of claim 3, wherein the predetermined difficulty is calculated based on a likelihood of the user repeating the first purchase and the second purchase.

6. The method of claim 3, wherein the predetermined difficulty is calculated based on a confidence threshold set by the authentication server.

7. An authentication method comprising:
receiving, from a user device in communication with an authentication server, an authentication request associated with a user in possession of the user device;
requesting, from a transaction history database, a transaction history associated with the user, the transaction history comprising a first purchase of a first product;
selecting, using a machine learning model, the first product to authenticate the user;
generating, by the machine learning model, an authentication quiz comprising:
an image of the first product, the image being obtained based on stock keeping unit (SKU) data of the first product; and
transmitting instructions to the user device to authenticate the user based on the first response.

8. The method of claim 7, wherein the transaction history further comprises a second purchase of a second product, and wherein the method further comprises:
selecting, by the machine learning model, the second product to authenticate the user;
updating, by the machine learning model, the authentication quiz to include:
an image of the second product, the image being obtained based on SKU data of the second product; and
a request to the user to confirm that the user purchased the second product; and
receiving, from the user device, a second response from the user confirming that the user purchased the second product, wherein transmitting instructions to the user device to authenticate the user is further based on the second response.

9. The method of claim 8, further comprising:
responsive to receiving the second response, selecting, by the machine learning model, a third product to authenticate the user, the third product being not purchased by the user;
updating, by the machine learning model, the authentication quiz to include:
an image of the third product, the image being obtained based on SKU data of the third product; and
a request to the user to confirm that the user purchased the third product; and
receiving, from the user device, a third response from the user denying that the user purchased the third product.

10. The method of claim 8, wherein the first purchase is associated with a first merchant and the second purchase is associated with a second merchant, and the images of the first product and the second product are obtained by requesting the first merchant and the second merchant, respectively, with the SKU data of the first product and the second product.

11. The method of claim 7, wherein the machine learning model comprises a machine learning fraud prediction model.

12. The method of claim 8, wherein the first product and the second product are selected based on a predetermined difficulty associated with the authentication request.

13. The method of claim 12, wherein the predetermined difficulty is calculated based on a likelihood of the user repeating the first purchase and the second purchase.

14. The method of claim 12, wherein the predetermined difficulty is calculated based on a confidence threshold set by the authentication server.

15. The method of claim 12, wherein the predetermined difficulty is calculated based on a recency of the first purchase and the second purchase.

16. The method of claim 15, wherein the transaction history associated with the user is requested based to include a number of purchases based on the recency and the predetermined difficulty.

17. An authentication method comprising:
receiving, from a user device in communication with an authentication server, an authentication request associated with a user in possession of the user device;

requesting, from a transaction history database, a transaction history associated with the user, the transaction history comprising a first purchase of a first product and a second purchase of a second product;

selecting, using a machine learning model, the first product and the second product to authenticate the user;

determining a first merchant associated with the first purchase and a second merchant associated with the second purchase;

generating, based on stock keeping unit (SKU) data, images of the first product and the second product;

generating, by the machine learning model, an authentication quiz comprising:
  the images of the first product and the second product;
  an indication of the first merchant and the second merchant; and
  a request to the user to match the first product and the second product to the corresponding merchant of the first merchant and the second merchant where the first purchase and the second purchase occurred;

receiving, from the user device, responses from the user matching the first product to the first merchant and the second product to the second merchant; and transmitting instructions to the user device to authenticate the user.

18. The method of claim 17, wherein the first purchase is associated with a first merchant and the second purchase is associated with a second merchant, and the images of the first product and the second product are obtained by requesting the first merchant and the second merchant, respectively, with the SKU data of the first product and the second product.

19. The method of claim 17, wherein the machine learning model comprises a machine learning fraud prediction model.

20. The method of claim 17, wherein the first product and the second product are selected based on a predetermined difficulty associated with the authentication request.

* * * * *